United States Patent [19]

Rangan et al.

[11] Patent Number: 5,987,493
[45] Date of Patent: Nov. 16, 1999

[54] METHOD AND APPARATUS DETERMINING THE LOAD ON A SERVER IN A NETWORK

[75] Inventors: Venkat Rangan, Fremont; James Goetz, San Jose, both of Calif.

[73] Assignee: INSoft Inc., Sunnyvale, Calif.

[21] Appl. No.: 08/986,226

[22] Filed: Dec. 5, 1997

[51] Int. Cl.⁶ .................................................. G06F 13/00
[52] U.S. Cl. .................. 709/105; 709/203; 709/224; 709/228
[58] Field of Search .................... 709/203, 224, 709/235, 236, 228, 105; 375/225

[56] References Cited

U.S. PATENT DOCUMENTS

| | | | |
|---|---|---|---|
| 5,802,106 | 9/1998 | Packer | 375/225 |
| 5,815,516 | 9/1998 | Aaker et al. | 709/236 |
| 5,822,524 | 10/1998 | Chen et al. | 709/203 |
| 5,864,678 | 1/1999 | Riddle | 709/235 |
| 5,878,224 | 3/1999 | Smith | 709/224 |

OTHER PUBLICATIONS

Douglas E. Comer, "Internetworking with TCP/IP : Principles, Protocols, and Architecture", vol. 1, 3rd Edition, pp. 91–92, 1995.

Primary Examiner—Ahmad F. Matar
Assistant Examiner—Philip B. Tran
Attorney, Agent, or Firm—Carr & Ferrell LLP

[57] ABSTRACT

A method and apparatus of measuring a server's network load based on information available in standard IP datagrams transmitted by a server from observations at the client. In the described embodiment, the IPID value in the standard IP datagram is used to calculate the number of IP datagrams transmitted by the server. A calculation may then be carried out to determine the rate of transmission and to provide comparisons with historical transmission rates and transmission rates for other servers.

19 Claims, 3 Drawing Sheets

METHOD AND APPARATUS DETERMINING THE LOAD ON A SERVER IN A NETWORK

BACKGROUND OF THE INVENTION

1. Field of the Invention

The present invention relates to the field of computer networks and more particularly to methods and apparatus for determining the load on a server in a distributed network such as the internet.

2. Description of the Related Art

Determining network loads on devices such as servers in a network is an integral function of network management. Traditionally, the load on a particular server in a network may be determined by proprietary network management software designed to manage the particular server. This information is available to a network administrator responsible for the server, but is not easily discoverable by any interested person.

It is desirable to discover server load information without access to specialized network management software designed for a particular server. If this information was available, it might be used, for example to explain delays in receiving responses at a client.

Network servers operating in accordance with standard IP protocols send IP datagrams to clients. The IP datagrams include an identification field (referred to herein as the IPID field) which provides a monotonically increasing value assigned to each IP datagram transmitted by the server. The IPID is designed to be used to allow for reassembly of packets. In certain cases, IP datagrams may have to be broken up or fragmented due to their overall length. All IP data fragments associated with a particular datagram are assigned the same IPID. Reassembly of the fragments is based on IPID.

FIG. 1 illustrates a typical transmission session between server and a client using the IP network layer protocol. Systems that originate IP datagrams must ensure that IPID is carefully selected to facilitate reassembly. One common practice is to start IPID at a random value in the range of 0 to 65,536 and increment the IPID by one for each IP datagram that is transmitted by the system. All intermediate devices which transmit the IP datagram are required to preserve the IPID field.

In one prior art approach, the IPID is utilized to perform offline analysis of a network.

SUMMARY OF THE INVENTION

A method of measuring server load based on information available in standard IP datagrams transmitted by the server is described. In the method, the measurement of server load is based on observations at the client end of the session. In the described embodiment, the IPID value in the standard IP datagram is used to calculate the number of IP datagrams transmitted by the server. A calculation may then be carried out to determine the rate of transmission and to provide comparisons with historical transmission rates and transmission rates for other servers.

Figure 1:
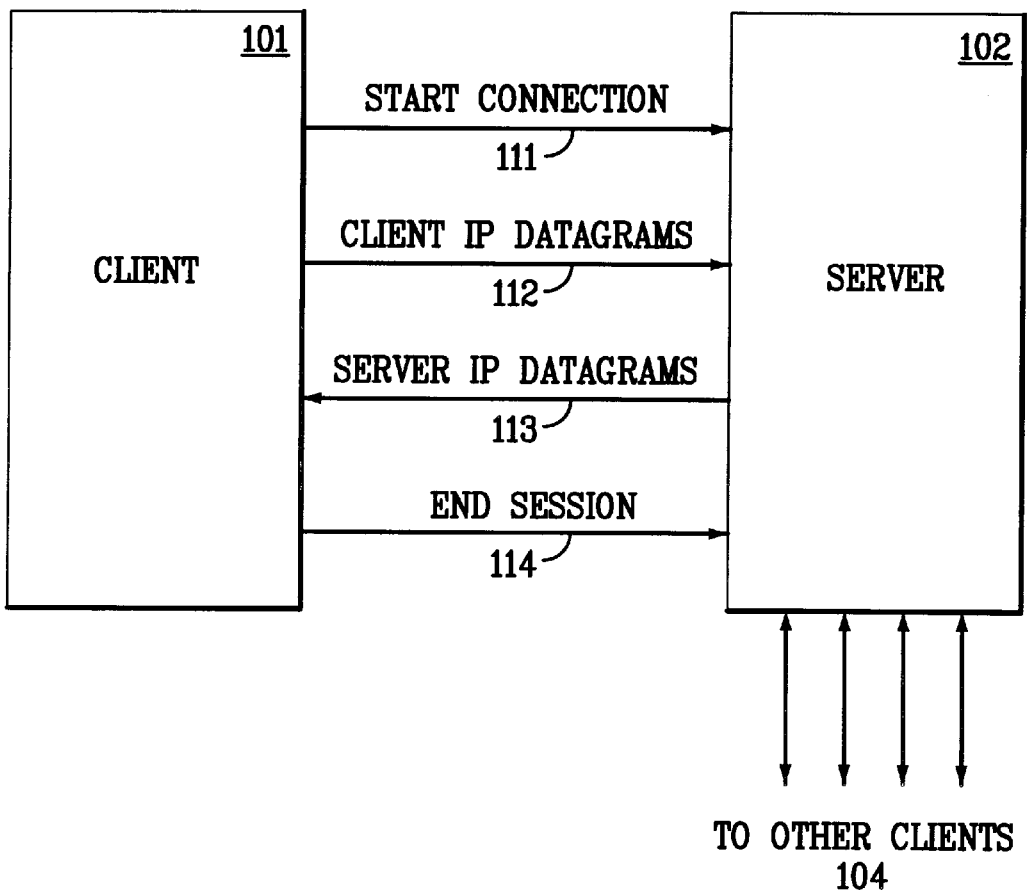
FIG. 1 is an illustration of a typical transmission session.
Figure 3:
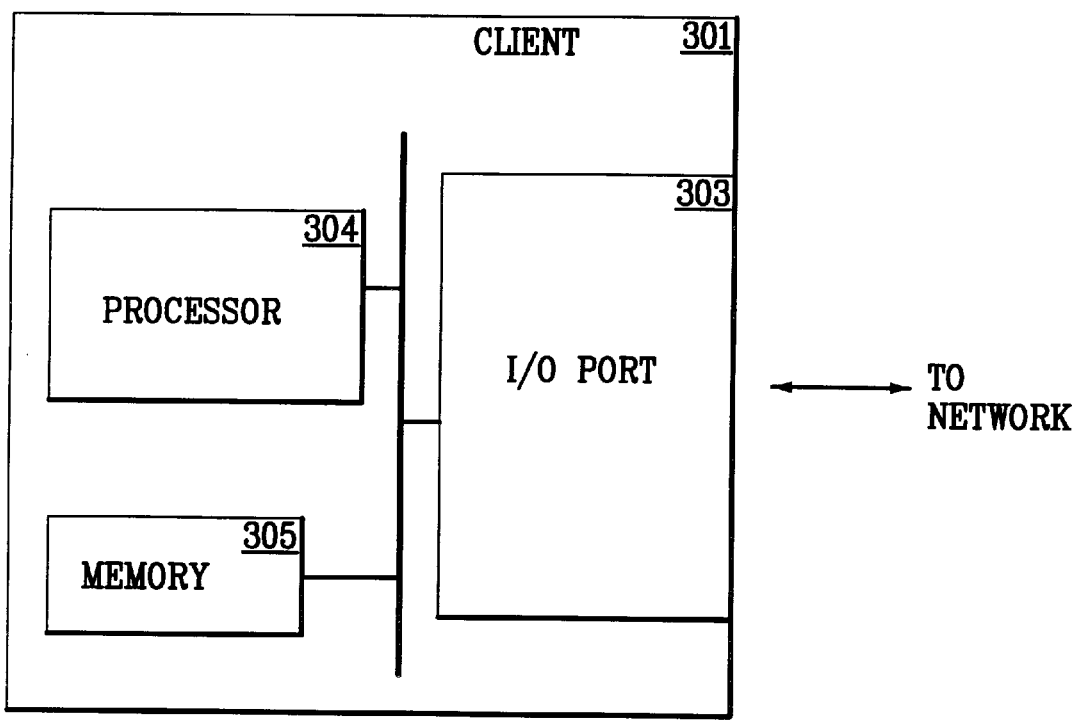
FIG. 3 is an illustration of a client device implementing the present invention.

For ease of reference, it might be pointed out that reference numerals in all of the accompanying drawings typically are in the form "drawing number" followed by two digits, xx; for example, reference numerals on FIG. 1 may be numbered 1xx; on FIG. 3, reference numerals may be numbered 3xx. In certain cases, a reference numeral may be introduced on one drawing and the same reference numeral may be utilized on other drawings to refer to the same item.

DETAILED DESCRIPTION OF THE EMBODIMENTS THE PRESENT INVENTION

FIG. 1 illustrates a typical transmission session between a client 101 and a server 102 over a network. Initially the client may make a request to start a connection 111. The network may be a local area network or a wide area network and may be implemented in a large, distributed network such as the internet. In the illustrated example, the network is an internet protocol (IP) network. However, other embodiments may implement other network protocols.

The client and server then transmit IP datagrams, 112 and 113, respectively until the session is ended. Although the embodiment described provides for transmission of IP datagrams, alternative embodiment may transmit alternative packet types. What is important is that when transmitted by the server, the data packet includes a counter value representation of the number of packets transmitted by the server. In the case of IP datagrams, an identification field (referred to herein as the IPID field) is specified to be included in the header of all data packets. The IPID field is a 16 bit (64K values) field which is incremented for each packet transmitted by the server (e.g. a monotonically increasing field).

The IPID field was defined to be included in IP datagrams to allow for reassembly of fragmented packets (see, e.g. Internet Protocol Specification, September, 1981, RFC 791). The background section further describes use of the IPID field.

In any event, the server may be servicing requests from a number of other clients 104 and demand on the server is influenced by many factors in addition to requests from client 101. It has been observed by the present invention that it would be useful, for purposes of understanding and eventually managing network loads, to know the rate at which the server 102 is processing packets and perhaps to compare that rate with the processing rates at other periods of time or the processing rates of other servers.

To discuss the typical network transmission of FIG. 1 in greater detail, initially the client 101 starts a connection 111. The server 102 and client 101 then exchange IP datagrams 112, 113 until the session is ended by 114. This is, of course, a simplified illustration of a client server session, but is sufficiently complete to allow an understanding of the present invention.

As has been mentioned, the server assigns each IP datagram an IPID value and those datagrams are received at the client 101. For sake of completeness, FIG. 3 provides a simplified illustrations of an architecture of a client device and illustrates that the data packet is received on I/O port 303. The packet then is processed under control of processor 304. Certain particulars of the processing carried out by processor 304 will be discussed in greater detail in connection with FIG. 2. The client also includes a memory 305 (and may comprise other components which are not necessary to detail for purposes of understanding the present invention). As will be discussed, the memory 305 stores, among other information, counter values from IP data packets and timestamp information indicating when the packets were received as well as other information (such as historical information and information describing performance characteristics of other servers) to allow comparisons with current server load information as calculated by the present invention.

Figure 2:
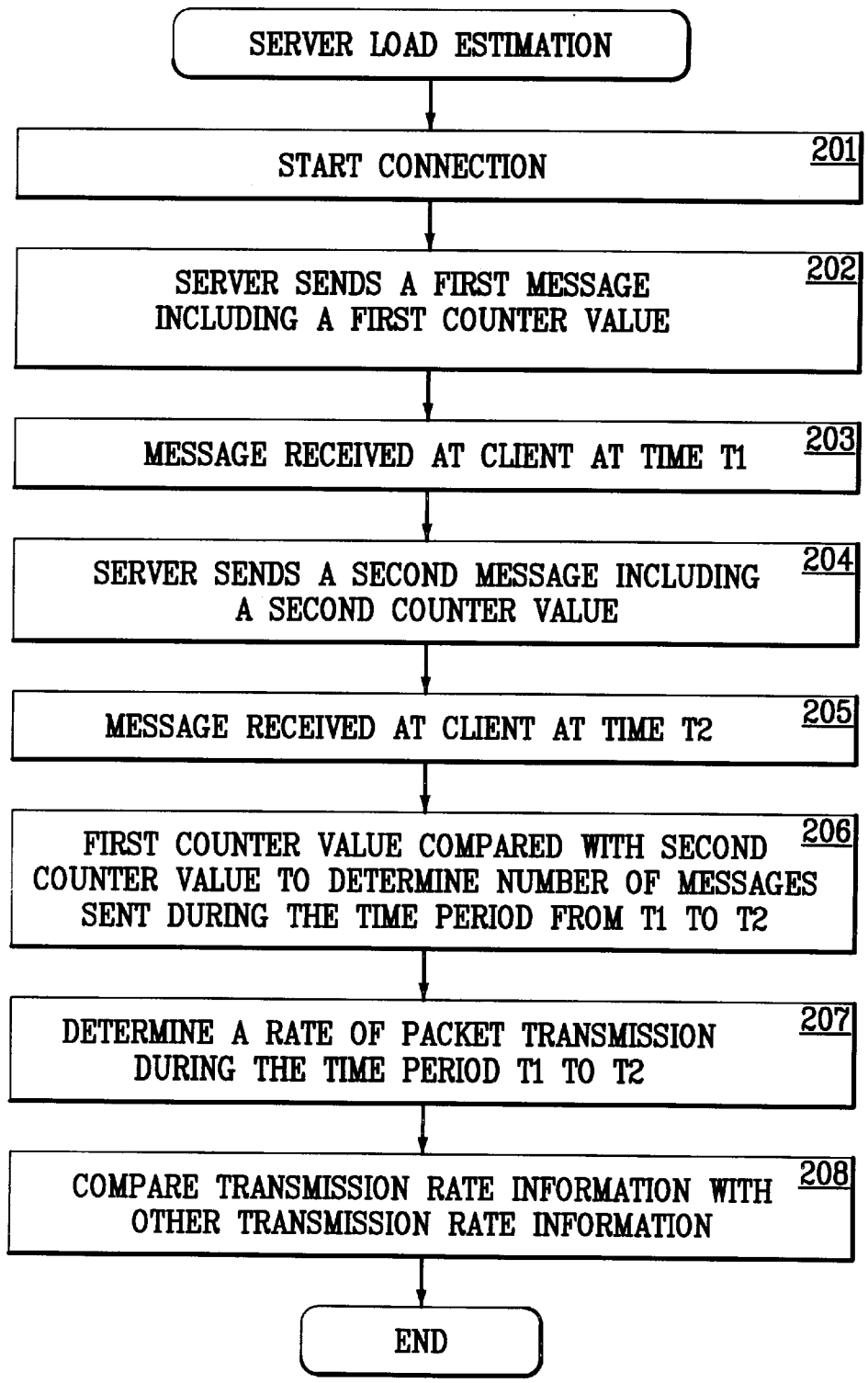
FIG. 2 is an overall flow diagram illustrating a method of measuring server load.

FIG. 2 illustrates an overall method as may be implemented by the present invention. Initially, as has been discussed above, a connection is started between the client 101 and server 102, block 201. As was discussed, the client 101 and server 102 then exchange messages. In the case of the described embodiment, IP datagrams are exchanged. Also, as has been discussed, the IP datagrams include, in their headers, an IPID which is set, in the case of messages sent by the server, as a monotonically increasing value (i.e., the value is increased by one for each IP datagram transmitted).

One significant feature of the present invention resides in the ability of the described method to determine server load from the client without requirement for the server to respond to special messages requesting server load information. Therefore, what is described in connection with FIG. 2 is IP datagrams as received by the client from the server and datagrams as sent from the client to the server are not described.

The server sends a message (referred to as the first message for identification purposes but this message may be any message transmitted by the server during the session), block 202. The message includes a counter value. In the case of the described embodiment, the counter value is the IPID. This message is received at the client at time T1 (for sake of example, assume the IPID is 1000 and the time T1 is 10:50:00), block 203. At some later point in time, the server sends another message (referred to as the second message for identification purposes, but this message may be any message transmitted by the server during the session which follows the first message in time), block 204, including a second counter value. The second message is received by the client at time T2 (for sake of example, assume that the IPID of the second message is 1200 and T2 is 10:50:10), block 205.

The first counter value (e.g., 1000) is then compared with the second counter value (e.g. 1200) to determine the number of messages sent during the time period between T1 and T2, block 206. In the case of the example, it is determined that 200 messages were sent. The rate of packet transmission is then determined, block 207. The rate may be expressed in terms of packets per second, or any other method of expressing transmission rates which may be appropriate for the packet transmission rate (e.g., packets per minute, packets per millisecond, etc.). In the case of the example, the rate may be computed as 20 packets per second.

Although knowledge of the packet transmission rate is valuable itself, the present invention also discloses that it may be useful to compare the transmission rate information with other transmission rate information, block 208. Thus, the client may store previous transmission rate information for the particular server 102 in a memory (e.g. disk, RAM, etc.) such as memory 305. The current transmission rate may be compared with historical transmission rates and information may then be displayed indicating whether the current transmission rate exceeds, equals or is less than historical transmission rates. Of course, this information may be displayed graphically in any of a number of forms (e.g. color coded, symbols, tabulated, etc). In this way, it can be determined if the server is currently transmitting more or less packets than the historical baseline. The current transmission rate information may also be compared with transmission rate information for other servers (which information may also be stored in memory 305). Thus, it can be determined if the present server is sending more or less data packets than a typical server.

Based on receiving and storing such information, significant useful information can be derived. For example, it can be determined, over time, that a particular server is historically relatively busy during certain hours of the day. Thus, the user may decide to communicate with the server during other times. It may also be known that the server is of a particular hardware and software configuration which is optimally capable of a particular packet transmission rate. The user can then be informed whether the server is exceeding the optimal packet transmission rate which may help to explain delays in response for requested information.

Thus, what has been described is a method and apparatus for determining server load on a server in a network.

What is claimed is:

1. A method for measuring load on a server in a network comprising the steps of:

receiving at time t1 at a client a first message from the server, the first message including a first counter value;

receiving at the client at time t2 a second message from the server, the second message including a second counter value; and comparing at the client the first counter value with the second counter value to determine the number of messages sent from the server during time period t1 to t2.

2. The method as recited by claim 1 wherein the first counter value and the second counter value represent a monotonically increasing value set by the server based on the number of messages transmitted by the server.

3. The method as recited by claim 1 wherein the first message and the second message are IP datagrams.

4. The method as recited by claim 1 wherein the first value and the second value represent the IPID value from the server.

5. The method as recited by claim 1 further comprising the step of calculating a rate of message transmission by dividing the number of messages sent during time period t1 to t2 with the number of time intervals during the time period t1 to t2.

6. The method as recited by claim 1 wherein the time intervals are seconds.

7. The method as recited by claim 5 wherein the rate of message transmission is compared with historical information regarding rate of message transmission for the server.

8. The method as recited by claim 5 wherein the rate of message transmission is compared with rates of message transmission for other servers.

9. A method estimating packets processed by a server during a time period comprising the steps of:

receiving at time t1 at a client a first message from the server, the first message including a first counter value;

receiving at the client at time t2 a second message from the server, the second message including a second counter value; and calculating at the client the number of packets processed by the server based on the first counter value and the second counter value.

10. The method as recited by claim 9 wherein the first counter value and the second counter value represent a monotonically increasing value set by the server based on the number of messages transmitted by the server.

11. The method as recited by claim 9 wherein the first message and the second message are IP datagrams.

12. The method as recited by claim 9 wherein the first value and the second value represent the IPID value from the server.

13. The method as recited by claim 9 further comprising the step of calculating a rate of message transmission by dividing the number of messages sent during time period t1 to t2 with the number of time intervals during the time period t1 to t2.

14. The method as recited by claim 9 wherein the time intervals are seconds.

15. The method as recited by claim 13 wherein the rate of message transmission is compared with historical information regarding rate of message transmission for the server.

16. The method as recited by claim 13 wherein the rate of message transmission is compared with rates of message transmission for other servers.

17. A client comprising:
 a) a port coupled to a network;
 b) a processor coupled in communication with the port;
 c) a memory coupled in communication with the processor, the memory having stored therein a first timestamp T1 associated with a first IP datagram received from a first server, a second timestamp T2 associated with a second IP datagram received from the first server, a first counter value from the first IP datagram and a second counter value from the second IP datagram, and program control for controlling the processor to calculate an estimated rate of packet transmission from a server to the client based on the first timestamp T1, the second timestamp T2, the first counter value and the second counter value.

18. The client as recited by claim 17 wherein the memory further stores historical information regarding rate of message transmission for the server.

19. The client as recited by claim 17 wherein memory further stores rates of message transmission for other servers.

* * * * *